United States Patent [19]

Temple et al.

[11] Patent Number: 4,790,704

[45] Date of Patent: Dec. 13, 1988

[54] RETAINER ASSEMBLY

[75] Inventors: Robert B. Temple, Granger; Donald D. Johannesen, South Bend, both of Ind.

[73] Assignee: Allied-Signal Inc., Morristown, N.J.

[21] Appl. No.: 99,869

[22] Filed: Sep. 22, 1987

[51] Int. Cl.⁴ .................................... F16B 21/18
[52] U.S. Cl. ........................... 411/522; 188/340; 267/158; 403/405.1; 411/508; 411/544
[58] Field of Search ............... 188/325, 340, 335; 403/405.1; 411/508, 509, 510, 512, 520, 522, 523, 524, 913, 544; 267/158

[56] References Cited

U.S. PATENT DOCUMENTS

| | | | |
|---|---|---|---|
| 2,186,834 | 1/1940 | Main | 188/78 |
| 2,263,949 | 1/1941 | Harle | 188/340 |
| 2,287,238 | 6/1942 | Geopfrich | 188/70.5 |
| 2,306,190 | 12/1942 | Sinclair | 188/341 |
| 2,905,278 | 9/1959 | Kramer | 188/335 |
| 2,951,674 | 9/1960 | Rice | 411/510 X |
| 3,297,916 | 1/1967 | Wright | 411/522 X |
| 3,438,664 | 4/1969 | Meyer | 411/520 X |
| 3,998,303 | 12/1976 | Wunderlich | 188/340 |
| 4,060,024 | 11/1977 | Deck | 411/522 |
| 4,312,614 | 1/1982 | Palmer et al. | 411/508 X |
| 4,623,050 | 11/1986 | Copp | 188/340 |

FOREIGN PATENT DOCUMENTS

| | | |
|---|---|---|
| 250459 | 3/1964 | Australia . |
| 955120 | 12/1956 | Fed. Rep. of Germany . |
| 2357377 | 5/1974 | Fed. Rep. of Germany . |
| 55-90729 | 7/1980 | Japan . |
| 38230 | 2/1986 | Japan .................. 188/325 |

Primary Examiner—George E. A. Halvosa
Attorney, Agent, or Firm—Larry J. Palguta; Ken C. Decker

[57] ABSTRACT

The retainer assembly (10) comprises a longitudinally extending retainer body (12) having an enlarged diameter or head member (14) at one end and an arrow-shaped or flared member (16) at the other end. A V-shaped leaf spring (20) has an opening (24) at the bottom of the V-shaped opening (22) which receives the retainer body (12) so that the spring (20) is disposed between the head member (14) and a surface (31) of a first member (30). The retainer body (12) extends through an opening (32) in the first member (30) and the flared member (16) is resiliently captured within a resilient receiving member (50) disposed within an opening (46) of the second member (40). The opening (46) in the second member (40) is in a second surface (44) disposed apart from a first surface (42) of the second member (40) which engages the first member (30). The receiving member (50) flexibly traps the flared member (16) after insertion therethrough so that the leaf spring (20) biases the first member (30) into engagement with the second member (40).

12 Claims, 1 Drawing Sheet

RETAINER ASSEMBLY

This invention relates generally to a retainer assembly for biasing resiliently a first member into engagement with the second member, and in particular to a retainer which biases a brake shoe web into engagement with a backing plate.

Many drum brakes are equipped with shoe holddown retainers which maintain the brake shoes in engagement with the backing plate of the drum brake. The web of each brake shoe is biased into engagement with the backing plate by means of the retainer assembly. Many such retainer assemblies have been proposed in the prior art, and it is desirable to provide a retainer assembly that may be easily assembled from the shoe side of the backing plate, which has a minimum number of parts, and which is inexpensively manufactured and easily assembled.

The present invention provides a solution to the above, in that the retainer assembly maintains a first member in engagement with a second member, and comprises a retainer body which extends longitudinally between a head member at one end and a flared member at the other end, a resilient member having an opening receiving the retainer body and abutting the head member, the resilient member disposed between said head member and a surface of the first member so that the retainer body extends through an opening in the first member, the second member having a pair of surfaces spaced apart from one another and one of the pair of surfaces having an opening, a receiving member disposed within the opening in the second member and having a passage therethrough, the receiving member gripping flexibly the second member so that insertion of the flared member through the passage in the receiving member causes the receiving member to be deformed resiliently by the flared member and then return toward an initial position wherein the receiving member retains the retainer body by means of engagement with the flared member and the retainer assembly biases the first member into engagement with the second member.

One way of carrying out the invention is described in detail below with reference to the drawings which illustrate an embodiment, in which.

Figure 1:
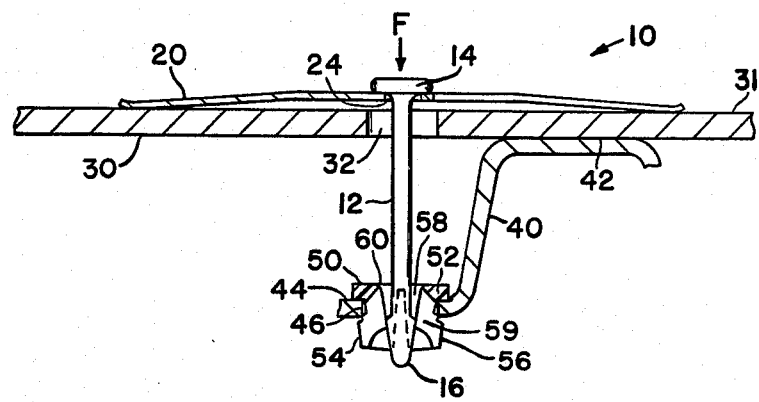
FIG. 1 is a section view of the retainer assembly of the present invention.
Figure 2:
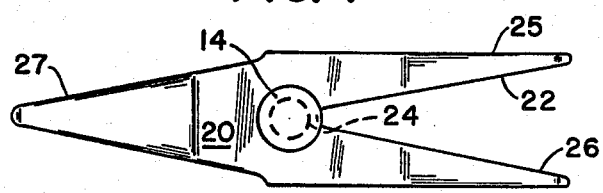
FIG. 2 is a top view of the retainer assembly.

The retainer assembly of the present invention is designated generally by reference numeral 10 in FIG. 1. Retainer assembly 10 comprises a longitudinally extending retainer body 12 having an enlarged diameter or head member 14 at one end and a flared member 16 disposed at the other end. Retainer body 12 has the general appearance of a nail with the flared member shaped like an arrowhead. A resilient member 20 is generally a V-shaped leaf spring (see FIG. 2) and includes at the bottom of the V-shaped opening 22 a circular opening 24 which receives the retainer body. The resilient member 20 engages retainer head member 14. Resilient member 20 includes resilient legs 25, 26, and 27. The brake shoe is shown in partial section as web portion or first member 30 which includes an opening 32. The backing plate or second member 40 includes a first surface 42 disposed axially apart from a second surface 44. Second surface 44 includes an opening 46 having a receiving member 50 disposed therein. Receiving member 50 is generally annular shaped and has an enlarged diameter head 52 extending into a plurality of four fingers 54. Each finger 54 has an outer circumferential surface 56 comprising a stepped diameter which engages portions of the opening 46. Receiving member 50 further includes an interior passage 58 which has a reduced interior diameter by means of radially extending finger portions 59. Radially extending finger portions 59 are each associated with respective fingers 54. Each finger 54 is attached to the adjacent head 52 by a flexible connection 60. Flexible connections 60 permit fingers 54 to be moved radially relative to one another.

Figure 3:
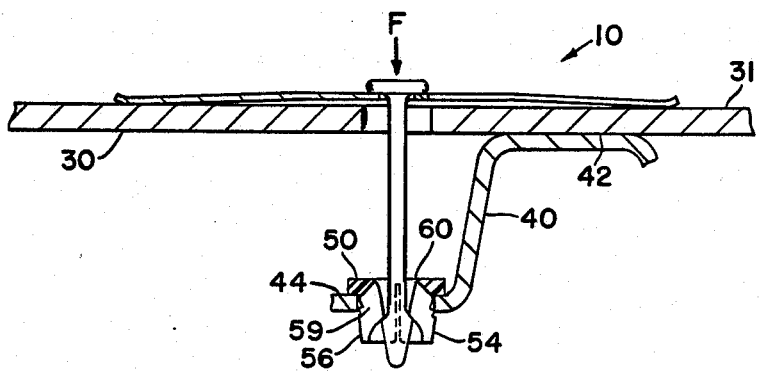
FIG. 3 is a section view of the retainer assembly being inserted into the receiving member.
Figure 4:
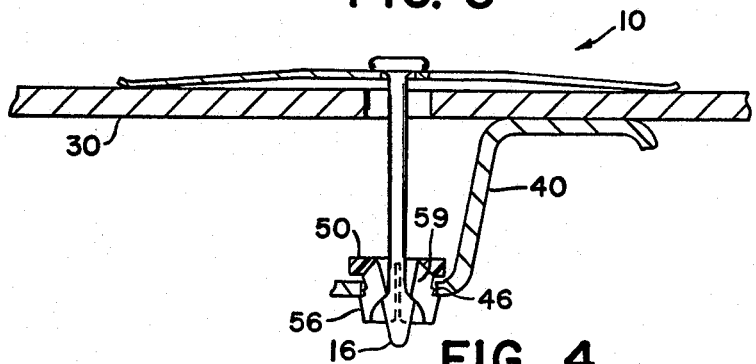
FIG. 4 is a section view after the applying force has been released from the head member of the retainer assembly.

In order to assemble brake shoe web 30 into engagement with first surface 42 of second member 40, the retainer body is inserted into opening 22 of the resilient member 20. Flared member 16 of assembly 10 is inserted through opening 32 so that resilient member 20 is trapped between the head member 14 and surface 31 of web 30. The flared member is inserted through receiving member 50 disposed in opening 46 of plate 40 wherein member 16 engages finger portions 59 and spreads them radially apart (see FIG. 1). As flared member 16 passes through fingers 54, the fingers rebound resiliently inwardly to snap into engagement behind the flared member and trap the retainer body between the receiving member and resilient member (see FIG. 3). The resilient member biases brake shoe web or first member 30 into engagement with first surface 42 of the second member of backing plate 40. When the applying force F (see FIG. 3) is relieved from head member 14, stepped diameter circumference 56 engages portions of opening 46 to move fingers 54 radially inwardly as the receiving member 50 is displaced slightly axially by body 12 and resilient member 20 (see FIG. 4). This causes finger portions 59 to prevent removal of flared member 16. FIG. 4 illustrates the retainer assembly after insertion when the applying force F has been removed therefrom.

While the invention has been described with respect to the detailed embodiment, it will be understood that the invention is capable of numerous rearrangements, modifications, and alterations, and such are intended to be within the scope of the appended claims.

We claim:

1. A retainer assembly for maintaining a first member in engagement with a second member, comprising a retainer body which extends longitudinally between a head member at one end and a flared member at the other end, a resilient member having an opening receiving the retainer body and abutting the head member, the resilient member disposed between said head member and a surface of the first member so that the retainer body extends through an opening in the first member, the second member having a pair of surfaces spaced apart from one another and one of the pair of surfaces having an opening, a receiving member disposed within the opening in the second member and having a passage therethrough, the receiving member gripping flexibly the second member so that insertion of the flared member through the passage in the receiving member causes the receiving member to be deformed resiliently by the flared member and then return toward an initial position wherein the receiving member retains the retainer body by means of engagement with the flared member, the resilient member biasing the head member so that the flared member retracts slightly axially the receiving member through the opening in the second member to cause the receiving member to capture securely the flared member, the receiving member including a stepped exterior circumference which engages said opening in the second member so that the slight axial retraction of the receiving member through the opening in the second member causes the receiving member to contract and engage more tightly the flared member, and the retainer assembly biasing the first member into engagement with the second member.

2. The retainer assembly in accordance with claim 1, wherein the receiving member includes at least one finger portion extending radially inwardly into the passage to provide a shoulder for engagement with said flared member.

3. The retainer assembly in accordance with claim 2, wherein the flared member comprises a substantially arrowshaped head.

4. The retainer assembly in accordance with claim 3, wherein the receiving member comprises a member dividend into quadrants, the quadrants connected via living hinge connections.

5. The retainer assembly in accordance with claim 3, wherein the receiving member comprises a circular member divided substantially into two halves and connected by a living hinge.

6. The retainer assembly in accordance with claim 5, wherein the resilient member comprises a substantially V-shaped leaf spring, the opening in the resilient member comprising an opening at the bottom of a V-shaped opening in the V-shaped leaf spring.

7. A retainer assembly for maintaining a first member in abutting engagement with a second member, the assembly extending between the members and biasing the members into engagement with one another, characterized in that the assembly comprises a retainer body which extends longitudinally between a head member at one end and a flared member at the other end, a resilient member having an opening receiving the retainer body and abutting the head member, the resilient member disposed between said head member and a surface of the first member so that the retainer body extends through an aligned opening in the first member, the second member having a pair of surfaces spaced apart from one another and one of the pair of surfaces having an opening, a receiving member disposed within the opening in the second member and having a passage therethrough, the receiving member gripping flexibly the second member so that insertion of the flared member through the passage in the receiving member causes the receiving member to be deformed resiliently by the flared member and then return toward an initial position wherein the receiving member retains the retainer body by means of engagement with the flared member, the resilient member biasing the head member so that the flared member moves slightly axially the receiving member through the opening in the second member to cause the receiving member to capture tightly the flared member, the receiving member including a stepped exterior circumference which engages said opening in the second member so that the slight axial movement of the receiving member through the opening in the second member causes the receiving member to engage more tightly the flared member, and the retainer assembly biasing the first member into abutting engagement with the second member.

8. The retainer assembly in accordance with claim 7, characterized in that the receiving member includes fingers extending radially inwardly into the passage to provide shoulders for engagement with said flared member.

9. The retainer assembly in accordance with claim 7, characterized in that the flared member comprises a substantially arrow-shaped head.

10. The retainer assembly in accordance with claim 7, characterized in that the receiving member comprises a member divided into quadrants, the quadrants connected via living hinge connections.

11. The retainer assembly in accordance with claim 7, characterized in that the receiving member comprises a circular member divided substantially into two halves and connected by a living hinge.

12. The retainer assembly in accordance with claim 11, characterized in that the resilient member comprises a substantially V-shaped leaf spring, the opening in the resilient member comprising an opening at the bottom of a V-shaped opening in the V-shaped leaf spring.

* * * * *